United States Patent
Zhao et al.

(10) Patent No.: US 10,268,307 B2
(45) Date of Patent: Apr. 23, 2019

(54) TOUCH DISPLAY PANEL, METHOD FOR DRIVING THE SAME AND TOUCH DISPLAY APPARATUS THAT IS CAPABLE OF PROVIDING A DOUBLE-SIDED TOUCH MODE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Weijie Zhao, Beijing (CN); Xue Dong, Beijing (CN); Haisheng Wang, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/306,145

(22) PCT Filed: Jul. 9, 2015

(86) PCT No.: PCT/CN2015/083641
§ 371 (c)(1),
(2) Date: Oct. 24, 2016

(87) PCT Pub. No.: WO2016/095504
PCT Pub. Date: Jun. 23, 2016

(65) Prior Publication Data
US 2017/0045995 A1    Feb. 16, 2017

(30) Foreign Application Priority Data

Dec. 16, 2014 (CN) .......................... 2014 1 0781935

(51) Int. Cl.
*G06F 3/045* (2006.01)
*G06F 3/041* (2006.01)
(Continued)

(52) U.S. Cl.
CPC .......... *G06F 3/0416* (2013.01); *G02F 1/1368* (2013.01); *G02F 1/13338* (2013.01);
(Continued)

(58) Field of Classification Search
None
See application file for complete search history.

(56) References Cited

U.S. PATENT DOCUMENTS 5,392,058 A * 2/1995 Tagawa ................ B25J 19/0012
345/103
8,810,524 B1 * 8/2014 Rosenberg ............ G06F 1/1643
345/1.1
(Continued)

FOREIGN PATENT DOCUMENTS

CN    101714037 A    5/2010
CN    103309072 A    9/2013
(Continued)

OTHER PUBLICATIONS

Dictionary.com definition of cell, http://www.dictionary.com/browse/array?s=t, p. 1.*
(Continued)

*Primary Examiner* — Abdul-Samad A Adediran
*Assistant Examiner* — Kirk W Hermann
(74) *Attorney, Agent, or Firm* — Brooks Kushman P.C.

(57) ABSTRACT

A touch display panel, a method for driving the same and a touch display apparatus are provided. The touch display panel includes an array substrate and a cell alignment substrate arranged oppositely, a touch driving electrode, a first touch sensitive electrode and a second touch sensitive (Continued)

electrode. The first touch sensitive electrode is arranged on the cell alignment substrate, and the second touch sensitive electrode is arranged on the array substrate, the touch driving electrode is arranged between the first touch sensitive electrode and the second touch sensitive electrode. Mutual capacitances are generated between the touch driving electrode with each of the first touch sensitive electrode and the second touch sensitive electrode. The double-sided touch mode can be achieved according to the disclosure.

10 Claims, 2 Drawing Sheets

(51) Int. Cl.
 *G06F 3/044* (2006.01)
 *G02F 1/1333* (2006.01)
 *G02F 1/1368* (2006.01)
 *G02F 1/1362* (2006.01)

(52) U.S. Cl.
 CPC ............ *G06F 3/044* (2013.01); *G06F 3/0412* (2013.01); *G02F 2001/13685* (2013.01); *G02F 2001/136218* (2013.01); *G06F 2203/04107* (2013.01)

(56) References Cited

U.S. PATENT DOCUMENTS

| | | |
|---|---|---|
| 9,495,044 B2 | 11/2016 | Kida et al. |
| 2008/0158181 A1 | 7/2008 | Hamblin et al. |
| 2010/0085325 A1 | 4/2010 | King-Smith et al. |
| 2011/0050599 A1 | 3/2011 | Sip |
| 2012/0235949 A1* | 9/2012 | Ligtenberg ............ G06F 1/1616 345/174 |
| 2013/0241869 A1* | 9/2013 | Kida ....................... G06F 3/044 345/174 |
| 2013/0301195 A1* | 11/2013 | Yeh ....................... G06F 3/0412 361/679.01 |
| 2015/0015517 A1 | 1/2015 | Zhao |
| 2016/0018923 A1 | 1/2016 | Zhang et al. |
| 2016/0034091 A1 | 2/2016 | Cheng et al. |
| 2016/0147342 A1* | 5/2016 | Xiong ................... G06F 3/0412 345/173 |
| 2016/0274712 A1 | 9/2016 | Liu et al. |
| 2017/0045995 A1 | 2/2017 | Zhao et al. |

FOREIGN PATENT DOCUMENTS

| | | |
|---|---|---|
| CN | 103425310 A | 12/2013 |
| CN | 103677476 A | 3/2014 |
| CN | 103699269 A | 4/2014 |
| CN | 103995617 A | 8/2014 |
| CN | 104090696 A | 10/2014 |
| CN | 104407761 A | 3/2015 |
| CN | 204242158 U | 4/2015 |
| WO | 2014190684 A1 | 12/2014 |

OTHER PUBLICATIONS

Dictionary.com definition of array, http://www.dictionary.com/browse/array?s=t, p. 1.*
Dictionary.com definition of cell, http://www.dictionary.com/browse/cell?s=t, p. 1.*
Dictionary.com definition of substrate, http://www.dictionary.com/browse/substrate?s=t, p. 1.*
Dictionary.com definition of panel, http://www.dictionary.com/browse/panel?s=t, p. 1.*
*MasterMine Software, Inc.* v. *Microsoft Corp.*, 2017, http://www.cafc.uscourts.gove/search/node/mastermine, p. 10.*
Second Office Action for Chinese Application No. 201410781935.8, dated Sep. 20, 2017, 7 Pages.
First Office Action for Chinese Application No. 201410781935.8, dated Feb. 24, 2017, 9 Pages.
International Search Report and Written Opinion for Application No. PCT/CN2015/083641, dated Oct. 9, 2016, 12 Pages.
Search Report for European Application No. EP 15869015, dated Jun. 15, 2018, 9 pages.
Third Office Action for Chinese Application No. 201410781935.8, dated Jan. 2, 2018, 8 Pages.

* cited by examiner

TOUCH DISPLAY PANEL, METHOD FOR DRIVING THE SAME AND TOUCH DISPLAY APPARATUS THAT IS CAPABLE OF PROVIDING A DOUBLE-SIDED TOUCH MODE

CROSS-REFERENCE TO RELATED APPLICATIONS

This application is the U.S. national phase of PCT Application No. PCT/CN2015/083641 filed on Jul. 9, 2015, which claims priority to Chinese Patent Application No. 201410781935.8 filed on Dec. 16, 2014, the disclosures of which are incorporated in their entirety by reference herein.

TECHNICAL FIELD

The disclosure relates to the field of displays, and in particular, to a touch display panel, a method for driving the same and a touch display apparatus.

BACKGROUND

Touch screens may be grouped into a plug-in touch screen (Add on Mode Touch Panel), a surface covering touch screen (On Cell Touch Panel), and a built-in touch screen (In Cell Touch Panel) according to their structures. For the built-in touch screen, a touch electrode of the touch screen is arranged inside a liquid crystal display screen, which can thin the thickness of the whole module and reduce greatly production costs of the touch screen.

When using the touch display apparatus with the built-in touch screen, a finger has to touch a display side of the touch display apparatus, which may affect the user's visual field.

SUMMARY

In view of the above, a touch display panel, a method for driving the same and a touch display apparatus are provided according to the disclosure, which can achieve double-sided touch at the touch display apparatus with a built-in touch panel.

A touch display panel is provided according to the disclosure, which includes: an array substrate and a cell alignment substrate arranged oppositely, a touch driving electrode, a first touch sensitive electrode and a second touch sensitive electrode. The first touch sensitive electrode is arranged on the cell alignment substrate, and the second touch sensitive electrode is arranged on the array substrate, the touch driving electrode is arranged between the first touch sensitive electrode and the second touch sensitive electrode, mutual capacitances are generated between the touch driving electrode with each of the first touch sensitive electrode and the second touch sensitive electrode.

Optionally, each of the array substrate and the cell alignment substrate includes a base substrate, the touch driving electrode is arranged on a side of the base substrate of the array substrate facing toward the cell alignment substrate, the first touch sensitive electrode is arranged on a side of the base substrate of the cell alignment substrate facing toward the array substrate or facing away from the array substrate, the second touch sensitive electrode is arranged on a side of the base substrate of the array substrate facing toward the cell alignment substrate or facing away from the cell alignment substrate.

Optionally, the array substrate further includes a common electrode, the touch driving electrode includes a first touch driving electrode, and the first touch driving electrode and the common electrode are made of the same material and arranged in the same layer.

Optionally, the touch driving electrode includes a second touch driving electrode, the second touch driving electrode is arranged in a different layer from the first touch driving electrode, a mutual capacitance is generated between the first touch driving electrode and the first touch sensitive electrode, and a mutual capacitance is generated between the second touch driving electrode and the second touch sensitive electrode.

Optionally, the array substrate further includes a thin film transistor, and the second touch driving electrode is a shutter bar arranged between the thin film transistor and the base substrate of the array substrate and configured for shielding a channel of the thin film transistor.

Optionally, the first touch driving electrode is electrically connected to the second touch driving electrode.

Optionally, the first touch driving electrode includes multiple first driving sub-electrodes arranged in parallel, the second touch driving electrode includes multiple second driving sub-electrodes arranged in parallel, and the first driving sub-electrodes are electrically connected to the second driving sub-electrodes respectively.

Optionally, the first touch sensitive electrode includes multiple first sensitive sub-electrodes arranged in parallel, the second touch sensitive electrode includes multiple second sensitive sub-electrodes arranged in parallel, the number and arrangement of the first sensitive sub-electrodes are the same as that of the second sensitive sub-electrodes, there is a one-to-one correspondence between the first sensitive sub-electrodes and the second sensitive sub-electrodes, and each of the first sensitive sub-electrodes is connected to the corresponding one of the second sensitive sub-electrodes; the first sensitive sub-electrodes and the first driving sub-electrodes are in different planes, and the first sensitive sub-electrodes are not parallel with the first driving sub-electrodes; a mutual capacitance is generated at each overlap portion of the first sensitive sub-electrodes and the first driving sub-electrodes; the second sensitive sub-electrodes and the second driving sub-electrodes are in different planes, and the second sensitive sub-electrodes are not parallel with the second driving sub-electrodes; a mutual capacitance is generated at each overlap portion of the second sensitive sub-electrodes and the second driving sub-electrodes.

Optionally, the first touch sensitive electrode includes multiple first sensitive sub-electrodes arranged in parallel, the second touch sensitive electrode includes multiple second sensitive sub-electrodes arranged in parallel, the number and arrangement of the first sensitive sub-electrodes are the same as that of the second sensitive sub-electrodes, there is a one-to-one correspondence between the first sensitive sub-electrodes and the second sensitive sub-electrodes, and each of the first sensitive sub-electrodes is connected to the corresponding one of the second sensitive sub-electrodes.

Optionally, each of the first sensitive sub-electrodes is connected to the corresponding one of the second sensitive sub-electrodes via a flexible circuit board arranged on a side of the cell alignment substrate, a flexible circuit board arranged on a side of the array substrate and a connection wire for connecting the two flexible circuit boards, the connection wire includes multiple connection sub-wires and each of the connection sub-wires corresponds to one of the first sensitive sub-electrodes and one of the second sensitive sub-electrodes.

A touch display apparatus is further provided according to the disclosure, which includes the touch display panel described above.

A method for driving a touch display panel is further provided according to the disclosure, which is applied to the touch display panel described above. The driving method includes:

applying a touch driving signal to the touch driving electrode; and detecting a touch sensitive signal generated by coupling the mutual capacitance between the first touch sensitive electrode and/or the second touch sensitive electrode with the touch driving electrode, and determining touch position information according to the change of the touch sensitive signal.

Optionally, the touch driving electrode includes a first touch driving electrode and a second touch driving electrode, a mutual capacitance is generated between the first touch driving electrode and the first touch sensitive electrode, a mutual capacitance is generated between the second touch driving electrode and the second touch sensitive electrode. The step of applying the touch driving signal to the touch driving electrode includes:

applying a touch driving signal to the first touch driving electrode or the second touch driving electrode; or applying the same touch driving signal or different touch driving signals to the first touch driving electrode and the second touch driving electrode.

Optionally, the method further includes: supplying a touch sensitive signal to the first touch sensitive electrode and the second touch sensitive electrode in a touch period, and supplying a zero voltage to the first touch sensitive electrode and the second touch sensitive electrode in a display period, to eliminate static electricity on the first touch sensitive electrode and the second touch sensitive electrode.

A touch display panel is further provided according to the disclosure, which includes: an array substrate and a cell alignment substrate arranged oppositely, a first touch driving electrode, a second touch driving electrode, a first touch sensitive electrode and a second touch sensitive electrode.

The first touch sensitive electrode is arranged on the cell alignment substrate, and the second touch sensitive electrode is arranged on the array substrate.

The first touch driving electrode and the second touch driving electrode are arranged in different layers between the first touch sensitive electrode and the second touch sensitive electrode. The first touch driving electrode and the first touch sensitive electrode define a first touch structure. The second touch driving electrode and the second touch sensitive electrode define a second touch structure.

The first touch structure and the second touch structure are arranged on two sides of the touch display panel, respectively.

Optionally, the first touch driving electrode includes multiple first driving sub-electrodes arranged in parallel, and the second touch driving electrode includes multiple second driving sub-electrodes arranged in parallel; the first touch sensitive electrode includes multiple first sensitive sub-electrodes arranged in parallel, the second touch sensitive electrode includes multiple second sensitive sub-electrodes arranged in parallel, the number and arrangement of the first sensitive sub-electrodes are the same as that of the second sensitive sub-electrodes, there is a one-to-one correspondence between the first sensitive sub-electrodes and the second sensitive sub-electrodes, and each of the first sensitive sub-electrodes is connected to the corresponding one of the second sensitive sub-electrodes; the first sensitive sub-electrodes and the first driving sub-electrodes are in different planes, and the first sensitive sub-electrodes are not parallel with the first driving sub-electrodes. A mutual capacitance is generated at each overlap portion of the first sensitive sub-electrodes and the first driving sub-electrodes. The second sensitive sub-electrodes and the second driving sub-electrodes are in different planes, and the second sensitive sub-electrodes are not parallel with the second driving sub-electrodes. A mutual capacitance is generated at each overlap portion of the second sensitive sub-electrodes and the second driving sub-electrodes.

Optionally, the first driving sub-electrodes are electrically connected to the second driving sub-electrodes respectively.

A method for driving a touch display panel is further provided according to the disclosure, which is applied to the touch display panel described above. The driving method includes:

judging whether the touch display panel is in a single-sided touch mode or a double-sided touch mode;

when the touch display panel is in the single-sided touch mode, judging whether the first touch structure or the second touch structure is selected for a touch operation;

when the first touch structure is selected for the touch operation, closing the second touch structure, applying a touch driving signal to the first touch driving electrode, detecting a first touch sensitive signal generated by coupling the mutual capacitance between the first touch sensitive electrode and the first touch driving electrode, and determining touch position information according to change of the first touch sensitive signal;

when the second touch structure is selected for the touch operation, closing the first touch structure, applying a touch driving signal to the second touch driving electrode, detecting a second touch sensitive signal generated by coupling the mutual capacitance between the second touch sensitive electrode and the second touch driving electrode, and determining touch position information according to change of the second touch sensitive signal;

when the touch display panel is in the double-sided touch mode, applying a touch driving signal to the first touch driving electrode and the second touch driving electrode at the same time;

detecting a first touch sensitive signal generated by coupling the mutual capacitance between the first touch sensitive electrode and the first touch driving electrode, and detecting a second touch sensitive signal generated by coupling the mutual capacitance between the second touch sensitive electrode and the second touch driving electrode; and determining touch position information according to change of the first touch sensitive signal and the second touch sensitive signal.

The disclosure has advantageous effects as follows: the double-sided touch is achieved with the two touch sensitive electrodes respectively arranged on the array substrate and the cell alignment substrate and the touch driving electrode arranged between the two touch sensitive electrodes.

DETAILED DESCRIPTION

Figure 1:
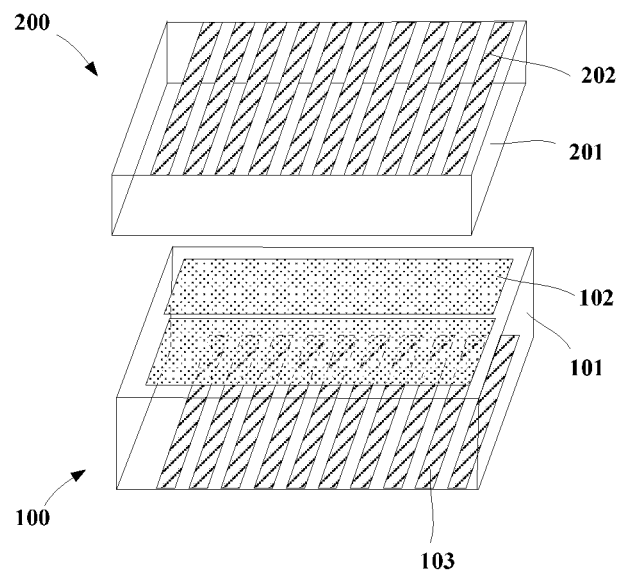
FIG. 1 is a schematic diagram of an arrangement of a touch driving electrode and a touch sensitive electrode of a touch display panel according to one embodiment of the disclosure.

To make the technical issues, technical solutions and advantages of the present disclosure clearer, embodiments of the present disclosure are described in detail with reference to drawings hereinafter.

A touch display panel is provided according to one embodiment of the disclosure, which includes: an array substrate and a cell alignment substrate arranged oppositely, a touch driving electrode, a first touch sensitive electrode and a second touch sensitive electrode. The first touch sensitive electrode is arranged on the cell alignment substrate. The second touch sensitive electrode is arranged on the array substrate. The touch driving electrode is arranged between the first touch sensitive electrode and the second touch sensitive electrode. The touch driving electrode and the first touch sensitive electrode are in different planes and are not parallel to each other. The touch driving electrode and the second touch sensitive electrode are in different planes and are not parallel to each other. Mutual capacitances are generated between the touch driving electrode with the first touch sensitive electrode, and between the touch driving electrode with the second touch sensitive electrode, respectively.

The touch driving electrode is to receive a touch driving signal in a touch period.

The first touch sensitive electrode and the second touch sensitive electrode are used to couple the touch driving signal via the mutual capacitances between the touch driving electrode and each of the first and second touch sensitive electrode, to obtain and output a touch sensitive signal in a touch period.

The mutual capacitances are generated at overlap portions of the touch sensitive electrodes and the touch driving electrode.

The operating principle of a touch display apparatus including the touch display panel according to the embodiment of the disclosure is described as follows.

Before a touch operation is performed, a static balance is maintained and a mutual capacitance Co exists between a touch driving electrode Tx and a touch sensitive electrode Rx (the first touch sensitive electrode or the second touch sensitive electrode). When a finger touches a sensing unit, coupling capacitances are generated between the finger with the touch driving electrode Tx and between the finger with the touch sensitive electrode Rx, respectively, and then the capacitance of the sensing unit becomes (Co+ΔC). Signals outputted by the touch sensitive electrode Rx may change quickly by scanning the touch driving electrode Tx line by line, thereby obtaining a touch point position (i.e., a row coordinate and a column coordinate of the touch point).

In the embodiment of the disclosure, double-sided touch can be achieved with the two touch sensitive electrodes respectively arranged on the array substrate and the cell alignment substrate and the touch driving electrode arranged between the two touch sensitive electrodes.

Optionally, each of the array substrate and the cell alignment substrate includes a base substrate. The touch driving electrode is arranged on a side of the base substrate of the array substrate facing toward the cell alignment substrate. The first touch sensitive electrode is arranged on a side of the base substrate of the cell alignment substrate facing toward the array substrate or facing away from the array substrate. The second touch sensitive electrode is arranged on a side of the base substrate of the array substrate facing toward the cell alignment substrate or facing away from the cell alignment substrate.

In some embodiments of the disclosure, the touch display panel may include only one layer of touch driving electrodes, and the touch driving electrode may generate mutual capacitances with the first touch sensitive electrode and the second touch sensitive electrode arranged at two sides of the touch driving electrode respectively, thereby achieving the double-sided touch.

The touch driving electrodes may be arranged in one layer separately, and may be formed by means of a separate patterning process. In order to save the process, the touch driving electrodes may also be formed together with a layer in the array substrate from one film layer in one patterning process.

Optionally, the array substrate further includes a common electrode, and the touch driving electrode includes a first touch driving electrode. The first touch driving electrode and the common electrode are made of the same material and arranged in the same layer. The touch driving electrode and the common electrode being made of the same material and arranged in the same layer means that the touch driving electrode and the common electrode are formed from one film layer in one patterning process, thereby saving costs.

Optionally, the first touch driving electrode includes multiple first driving sub-electrodes, and the common electrode includes multiple common sub-electrodes. The first driving sub-electrode and the common sub-electrode are arranged in an insulated crossing way. A common electrode signal and a touch driving signal are applied to the first driving sub-electrode in a time-sharing manner in a period of time for displaying a frame of image.

In the embodiment of the disclosure, the touch period and the display period are driven in a time-sharing manner. Therefore, in one aspect, a display driving chip and a touch driving chip are integrated into a single chip, thereby reducing the production costs. In another aspect, the mutual interference between the display operation and the touch operation can be reduced in the time-sharing driving manner, thereby improving the quality of images and the accuracy of the touch operation.

Specifically, the period of time for displaying a frame of image may be divided into a display period and a touch period. In the display period, the touch driving electrode Tx acts as a common electrode, and a constant common electrode signal is supplied by an IC chip connected to the touch driving electrode to the touch driving electrode, thereby achieving a display function. In the touch period, a touch driving signal is supplied by the IC chip connected to the touch driving electrode to the touch driving electrode, and the touch sensitive electrode detects a touch sensitive signal, thereby achieving a touch function. Meanwhile, a common electrode signal is constantly applied to the common electrode in the display period and the touch period. Optionally, a common electrode signal is applied to the common electrode in the display period, and the common electrode is grounded or floated in the touch period. The "floated" means that no signal is inputted.

Referring to FIG. 1, it is a schematic diagram of an arrangement of a touch driving electrode and a touch sensitive electrode of a touch display panel according to one embodiment of the disclosure. The touch display panel includes: an array substrate 100 and a cell alignment substrate 200. The array substrate 100 includes a base substrate 101, a first touch driving electrode 102 arranged on a side of the base substrate 101 facing toward the cell alignment substrate 200, and a second touch sensitive electrode 103 arranged on a side of the base substrate 101 facing away from the cell alignment substrate 200. The cell alignment substrate 200 includes a base substrate 201, and a first touch sensitive electrode 202 arranged on a side of the base substrate 201 facing away from the array substrate 100. The first touch driving electrode 102 and the common electrode of the array substrate 100 are made of the same material and arranged in the same layer.

In some embodiments of the disclosure, the touch display panel may also include two layers of touch driving electrodes. Then, mutual capacitances are generated between one of the two layers of touch driving electrodes and corresponding one of the two touch sensitive electrodes respectively, thereby achieving the double-sided touch mode.

Optionally, in addition to the first touch driving electrode, the touch driving electrode according to the embodiment of the disclosure may further include a second touch driving electrode. The second touch driving electrode is arranged in a different layer from the first touch driving electrode. A mutual capacitance is generated between the first touch driving electrode and the first touch sensitive electrode. A mutual capacitance is generated between the second touch driving electrode and the second touch sensitive electrode.

In a case that a thin film transistor of the array substrate is a top-gate thin film transistor, generally, the array substrate may further include a shutter bar arranged between the thin film transistor and the base substrate of the array substrate and configured for shielding a channel of the thin film transistor, in order to prevent lights from illuminating the channel of the thin film transistor. The shutter bar may be made of a metal material. In the embodiment of the disclosure, the shutter bar may be used as the second touch driving electrode, thereby saving costs.

It should be noted that the top-gate thin film transistor in the embodiment of the disclosure may be a low temperature polysilicon thin film transistor.

Of course, in some embodiments of the disclosure, a layer of second touch driving electrodes may be prepared separately.

Figure 2:
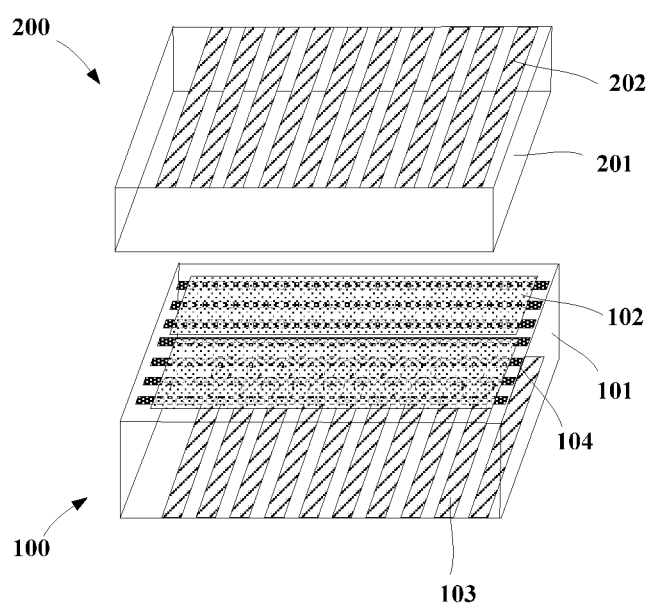
FIG. 2 is a schematic diagram of an arrangement of a touch driving electrode and a touch sensitive electrode of a touch display panel according to another embodiment of the disclosure.

Referring to FIG. 2, it is a schematic diagram of the arrangement of a touch driving electrode and a touch sensitive electrode of a touch display panel according to another embodiment of the disclosure. The touch display panel includes: an array substrate 100 and a cell alignment substrate 200. The array substrate 100 includes a base substrate 101, a first touch driving electrode 102 and a second touch driving electrode 104 arranged on a side of the base substrate 101 facing toward the cell alignment substrate 200, and a second touch sensitive electrode 103 arranged on a side of the base substrate 101 facing away from the cell alignment substrate 200. The cell alignment substrate 200 includes a base substrate 201, and a first touch sensitive electrode 202 arranged on a side of the base substrate 201 facing away from the array substrate 100. The first touch driving electrode 102 and the common electrode of the array substrate 100 are made of the same material and arranged in the same layer. The second touch driving electrode 104 is a shutter bar arranged between the thin film transistor and the base substrate of the array substrate and configured for shielding a channel of the thin film transistor.

A mutual capacitance is generated between the first touch driving electrode 102 and the first touch sensitive electrode 202. A mutual capacitance is generated between the second touch driving electrode 104 and the second touch sensitive electrode 103. Therefore, the double-sided touch is achieved.

When only the first touch driving electrode is used, a part of the signals of the first touch driving electrode may be shielded by gate lines or data lines arranged between the first touch driving electrode and the second touch sensitive electrode 103, thereby affecting the touch effect. In the embodiment of the disclosure, the second touch driving electrode 104 is added, and a touch driving signal is supplied to the second touch sensitive electrode 103 via the second touch driving electrode 104, thereby optimizing the touch effect.

In addition, the existing shutter bar may be used as the second touch driving electrode 104 to save costs.

Optionally, the first touch driving electrode is electrically connected to the second touch driving electrode to reduce the resistances of the touch driving electrodes in the above embodiment.

Optionally, the first touch driving electrode includes multiple first driving sub-electrodes arranged in parallel, the second touch driving electrode includes multiple second driving sub-electrodes arranged in parallel. The first driving sub-electrodes are electrically connected to the second driving sub-electrodes respectively.

The first driving sub-electrode and the corresponding second driving sub-electrode may be connected through a via hole, or may also be connected via a connection wire in the peripheral region.

Taking the touch display panel shown in FIG. 2 as an example, one first touch driving electrode 102 is correspondingly electrically connected to multiple shutter bars (second touch driving electrodes 104). That is, one touch driving electrode includes one first touch driving electrode 102 and multiple corresponding second touch driving electrodes 104.

Optionally, the first touch sensitive electrode includes multiple first sensitive sub-electrodes arranged in parallel, the second touch sensitive electrode includes multiple second sensitive sub-electrodes arranged in parallel. The number and arrangement of the first sensitive sub-electrodes are the same as that of the second sensitive sub-electrodes, there is a one-to-one correspondence between the first sensitive sub-electrodes and the second sensitive sub-electrodes. Each of the first sensitive sub-electrodes is connected to the corresponding one of the second sensitive sub-electrodes. With such structure, it can be ensured that the same touch positions exist on the double sides and the resistances of the touch sensitive electrodes can be reduced.

The first sensitive sub-electrodes and the first driving sub-electrodes are in different planes, and the first sensitive sub-electrodes are not parallel with the first driving sub-electrodes. A mutual capacitance is generated at each overlap portion of the first sensitive sub-electrodes and the first driving sub-electrodes. The second sensitive sub-electrodes and the second driving sub-electrodes are in different planes, and the second sensitive sub-electrodes are not parallel with the second driving sub-electrodes. A mutual capacitance is generated at each overlap portion of the second sensitive sub-electrodes and the second driving sub-electrodes.

Optionally, each of the first sensitive sub-electrodes is connected to the corresponding one of the second sensitive sub-electrodes via a flexible circuit board (FPC) arranged on a side of the cell alignment substrate, a flexible circuit board arranged on a side of the array substrate and a connection wire for connecting the two flexible circuit boards. The connection wire includes multiple connection sub-wires, and each of the connection sub-wires corresponds to one of the first sensitive sub-electrodes and one of the second sensitive sub-electrodes.

Figure 3:
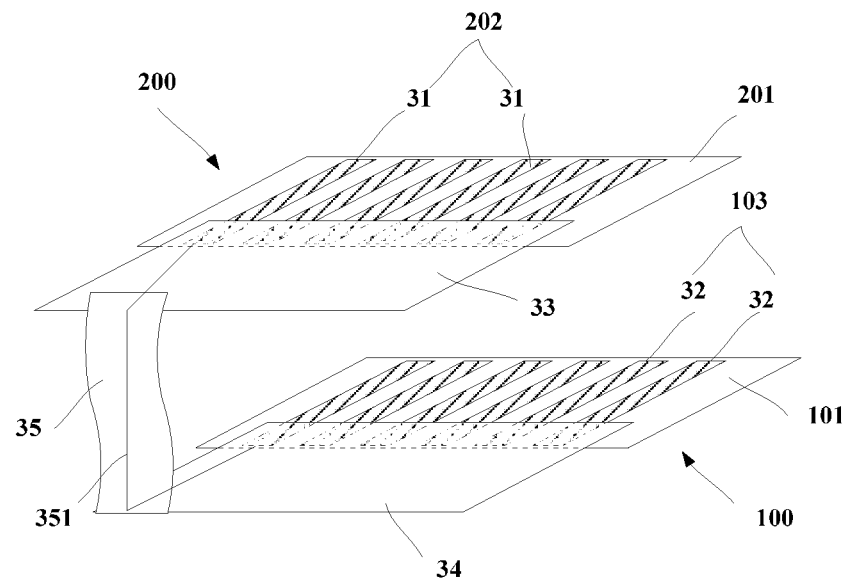
FIG. 3 is a schematic diagram of a touch sensitive electrode of a display panel according to one embodiment of the disclosure.

Referring to FIG. 3, it is a schematic diagram of a touch sensitive electrode of a display panel according to one embodiment of the disclosure. The display panel includes an array substrate 100 and a cell alignment substrate 200. The array substrate 100 includes a base substrate 101 and a second touch sensitive electrode 103. The cell alignment substrate 200 includes a base substrate 201 and a first touch sensitive electrode 202.

The first touch sensitive electrode 202 includes multiple first sensitive sub-electrodes 31 arranged in parallel. The second touch sensitive electrode 103 includes multiple second sensitive sub-electrodes 32 arranged in parallel. The number and arrangement of the first sensitive sub-electrodes 31 are the same as that of the second sensitive sub-electrodes 32, and there is a one-to-one correspondence between the first sensitive sub-electrodes 31 and the second sensitive sub-electrodes 32. Each of the first sensitive sub-electrodes 31 is electrically connected to the corresponding one of the second sensitive sub-electrodes 32 via a flexible circuit board 33 arranged on a side of the cell alignment substrate 200, a flexible circuit board 34 arranged on a side of the array substrate 100 and a connection wire 35 for connecting the two flexible circuit boards. The connection wire 35 includes multiple connection sub-wires 351 and each of the connection sub-wires 351 corresponds to one of the first sensitive sub-electrodes 31 and one of the second sensitive sub-electrodes 32.

The touch display panel in the above embodiments may be a liquid crystal display panel. The cell alignment substrate is a color film substrate while the touch display panel is the liquid crystal display panel. Of course, the touch display panel according to the embodiment of the disclosure may be a display panel of other types, for example, an organic light emitting diode display panel.

A structure of the touch display panel according to the embodiment of the disclosure is illustrated by taking the touch display panel being the liquid crystal display panel as an example below.

Figure 4:
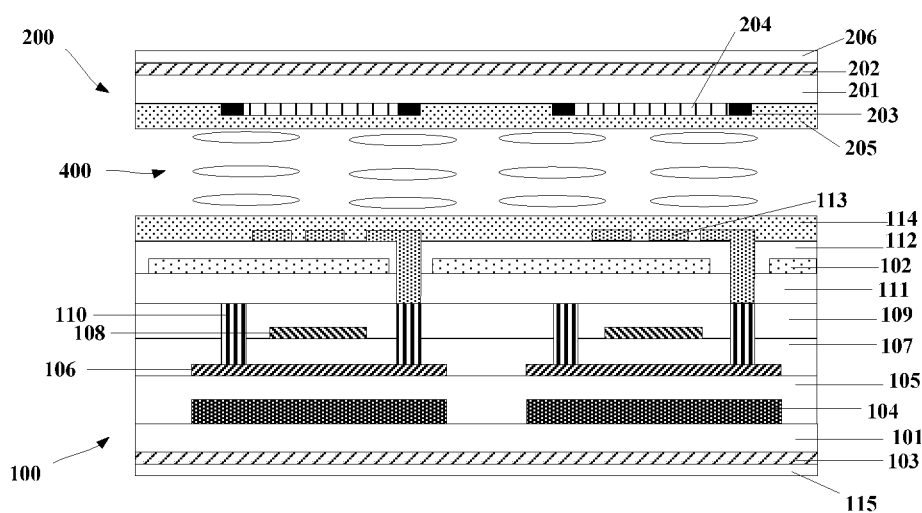
FIG. 4 is a schematic diagram of a touch display panel according to one embodiment of the disclosure.

Referring to FIG. 4, it is a schematic diagram of a touch display panel according to one embodiment of the disclosure. The display panel includes an array substrate 100, a color film substrate 200, and a liquid crystal layer 400 arranged between the array substrate 100 and the color film substrate 200.

The array substrate 100 includes a base substrate 101, a second touch driving electrode (shutter bar) 104, a first insulating layer 105, an active layer 106, a gate insulating layer 107, a gate electrode 108, a second insulating layer 109, a source-drain electrode 110, a third insulating layer 111, a first touch driving electrode 102, a passivation layer 112, pixel electrodes 113 and a first alignment layer 114 arranged on a side of the base substrate 101 facing toward the color film substrate 200, and a second touch sensitive electrode 103 and a first polarizer 115 arranged on a side of the base substrate 101 facing away from the color film substrate 200.

The color film substrate 200 includes a base substrate 201, a black matrix 203, a color filter layer 204 and a second alignment layer 205 arranged on a side of the base substrate 201 facing toward the array substrate 100, and a first touch sensitive electrode 202 and a second polarizer 206 arranged on a side of the base substrate 201 facing away from the array substrate 100.

A mutual capacitance is generated between the first touch driving electrode 102 and the first touch sensitive electrode 202. A mutual capacitance is generated between the second touch driving electrode 104 and the second touch sensitive electrode 103. Therefore, the double-sided touch is achieved.

A touch display apparatus is further provided according to one embodiment of the disclosure, which includes the touch display panel described above.

In using the touch display apparatus according to the embodiment of the disclosure, the user can perform a touch operation with a finger on a back side of the touch display apparatus, which has no effect on a front view and cause a flexible usage effect.

In addition, the touch display apparatus according to the embodiment of the disclosure may also be a touch display apparatus with a double-sided display function, that is, the display function and the touch function can be achieved on the double sides of the touch display apparatus.

A method for driving a touch display panel is further provided according to one embodiment of the disclosure, which is applied to the touch display panel according to any one of the embodiments described above. The driving method includes:

Step S1, applying a touch driving signal to the touch driving electrode.

Step S2, detecting a touch sensitive signal generated by coupling the mutual capacitance between the first touch sensitive electrode and/or the second touch sensitive electrode with the touch driving electrode, and determining touch position information according to the change of the touch sensitive signal.

Optionally, the touch driving electrode includes a first touch driving electrode and a second touch driving electrode. A mutual capacitance is generated between the first touch driving electrode and the first touch sensitive electrode. A mutual capacitance is generated between the second touch driving electrode and the second touch sensitive electrode. That is, one touch structure is defined by the first touch driving electrode and the first touch sensitive electrode; and one touch structure is defined by the second touch driving electrode and the second touch sensitive electrode.

The step of applying a touch driving signal to the touch driving electrode includes:

applying a touch driving signal to the first touch driving electrode or the second touch driving electrode; or applying the same touch driving signal or different touch driving signals to the first touch driving electrode and the second touch driving electrode.

Specifically, since one touch structure is defined by the first touch driving electrode and the first touch sensitive electrode and one touch structure is defined by the second touch driving electrode and the second touch sensitive electrode, in the embodiment of the disclosure, only one touch structure may be used and the other touch structure is closed at the same time, thereby achieving the single-sided touch mode; optionally, the two touch structures are used at the same time, thereby achieving the double-sided touch mode.

In a case that only one touch structure is used at the same time, for example, only the touch structure defined by the first touch driving electrode and the first touch sensitive electrode is used, a touch driving signal may be applied to only the first touch driving electrode, rather than the second touch driving electrode.

In a case that the two touch structures are used at the same time, a touch driving signal is applied to the first touch driving electrode and the second touch driving electrode at the same time. The touch driving signal applied to the first touch driving electrode and the second touch driving electrode may be the same or may also be different.

In some additional embodiments of the disclosure, the first touch driving electrode may be electrically connected to the second touch driving electrode, in order to reduce resistances of the touch driving electrodes. In this case, the same touch driving signal is applied to the first touch driving electrode and the second touch driving electrode.

The method according to the embodiment of the disclosure further includes: supplying a touch sensitive signal to the first touch sensitive electrode and the second touch sensitive electrode in a touch period, supplying a zero voltage to the first touch sensitive electrode and the second touch sensitive electrode in a display period, to eliminate static electricity on the first touch sensitive electrode and the second touch sensitive electrode.

The forgoing descriptions are only the optional embodiments of the present disclosure, and it should be noted that numerous improvements and modifications made to the present disclosure may further be made by those skilled in the art without being departing from the principle of the present disclosure, and those improvements and modifications shall fall into the scope of protection of the disclosure.

What is claimed is:

1. A touch display panel, comprising: an array substrate and a cell alignment substrate arranged oppositely, a touch driving electrode, a first touch sensitive electrode and a second touch sensitive electrode;
    wherein the first touch sensitive electrode is on the cell alignment substrate, and the second touch sensitive electrode is on the array substrate, the touch driving electrode is between the first touch sensitive electrode and the second touch sensitive electrode; mutual capacitances are generated between the touch driving electrode with each of the first touch sensitive electrode and the second touch sensitive electrode;
    wherein each of the array substrate and the cell alignment substrate comprises a base substrate; the touch driving electrode is on a side of the base substrate of the array substrate facing toward the cell alignment substrate; the first touch sensitive electrode is on a side of the base substrate of the cell alignment substrate facing toward the array substrate or facing away from the array substrate; the second touch sensitive electrode is on the side of the base substrate of the array substrate facing toward the cell alignment substrate or a side of the base substrate of the array substrate facing away from the cell alignment substrate;
    wherein the array substrate further comprises a common electrode; the touch driving electrode comprises a first touch driving electrode; the first touch driving electrode and the common electrode are made of a same material and arranged in a same layer;
    wherein the touch driving electrode further comprises a second touch driving electrode; the second touch driving electrode is in a different layer from the first touch driving electrode; one of the mutual capacitances is generated between the first touch driving electrode and the first touch sensitive electrode; and an other one of the mutual capacitances is generated between the second touch driving electrode and the second touch sensitive electrode; and
    wherein the array substrate further comprises a thin film transistor; the second touch driving electrode is a shutter bar between the thin film transistor and the base substrate of the array substrate and configured for shielding a channel of the thin film transistor.

2. The touch display panel according to claim 1, wherein the first touch driving electrode is electrically connected to the second touch driving electrode.

3. The touch display panel according to claim 2, wherein the first touch driving electrode comprises a plurality of first driving sub-electrodes which are parallel to each other; the second touch driving electrode comprises a plurality of second driving sub-electrodes which are parallel to each other; the first driving sub-electrodes are electrically connected to the second driving sub-electrodes respectively.

4. The touch display panel according to claim 3, wherein the first touch sensitive electrode comprises a plurality of first sensitive sub-electrodes which are parallel to each other; the second touch sensitive electrode comprises a plurality of second sensitive sub-electrodes which are parallel to each other; a quantity and arrangement of the first sensitive sub-electrodes are identical to that of the second sensitive sub-electrodes; the first sensitive sub-electrodes correspond to the second sensitive sub-electrodes in a one-to-one manner; and each of the first sensitive sub-electrodes is connected to a corresponding one of the second sensitive sub-electrodes; and
    wherein the first sensitive sub-electrodes and the first driving sub-electrodes are in two different planes, and the first sensitive sub-electrodes are not parallel with the first driving sub-electrodes; the one of the mutual capacitances is generated at each overlap portion of the first sensitive sub-electrodes and the first driving sub-electrodes; the second sensitive sub-electrodes and the second driving sub-electrodes are in another two different planes, and the second sensitive sub-electrodes are not parallel with the second driving sub-electrodes; the other one of the mutual capacitances is generated at each overlap portion of the second sensitive sub-electrodes and the second driving sub-electrodes.

5. The touch display panel according to claim 1, wherein the first touch sensitive electrode comprises a plurality of first sensitive sub-electrodes which are parallel to each other; the second touch sensitive electrode comprises a plurality of second sensitive sub-electrodes which are parallel to each other; a quantity and arrangement of the first sensitive sub-electrodes are identical to that of the second sensitive sub-electrodes; the first sensitive sub-electrodes correspond to the second sensitive sub-electrodes in a one-to-one manner; and each of the first sensitive sub-electrodes is connected to the corresponding one of the second sensitive sub-electrodes.

6. The touch display panel according to claim 5, wherein each of the first sensitive sub-electrodes is connected to the corresponding one of the second sensitive sub-electrodes via a flexible circuit board on a side of the cell alignment substrate, another flexible circuit board on a side of the array substrate and a connection wire for connecting the two flexible circuit boards; the connection wire comprises a plurality of connection sub-wires and each of the connection sub-wires corresponds to one of the first sensitive sub-electrodes and one of the second sensitive sub-electrodes.

7. A touch display apparatus, comprising: the touch display panel according to claim 1.

8. A touch display panel, comprising: an array substrate and a cell alignment substrate that is arranged oppositely to the array substrate, a first touch driving electrode, a second touch driving electrode, a first touch sensitive electrode and a second touch sensitive electrode;
- wherein the first touch sensitive electrode is on the cell alignment substrate, and the second touch sensitive electrode is on the array substrate;
- wherein the first touch driving electrode and the second touch driving electrode are in different layers between the first touch sensitive electrode and the second touch sensitive electrode; the first touch driving electrode and the first touch sensitive electrode define a first touch structure; the second touch driving electrode and the second touch sensitive electrode define a second touch structure; and
- the first touch structure and the second touch structure are at two sides of the touch display panel respectively;
- wherein the first touch driving electrode comprises a plurality of first driving sub-electrodes which are parallel to each other; the second touch driving electrode comprises a plurality of second driving sub-electrodes which are parallel to each other;
- the first touch sensitive electrode comprises a plurality of first sensitive sub-electrodes which are parallel to each other; the second touch sensitive electrode comprises a plurality of second sensitive sub-electrodes which are parallel to each other; the number and arrangement of the first sensitive sub-electrodes are identical to that of the second sensitive sub-electrodes; the first sensitive sub-electrodes correspond to the second sensitive sub-electrodes in a one-to-one manner; each of the first sensitive sub-electrodes is connected to the corresponding one of the second sensitive sub-electrodes; and
- the first sensitive sub-electrodes and the first driving sub-electrodes are in two different planes, and the first sensitive sub-electrodes are not parallel with the first driving sub-electrodes; a first mutual capacitance is generated at each overlap portion of the first sensitive sub-electrodes and the first driving sub-electrodes; the second sensitive sub-electrodes and the second driving sub-electrodes are in another two different planes, and the second sensitive sub-electrodes are not parallel with the second driving sub-electrodes; a second mutual capacitance is generated at each overlap portion of the second sensitive sub-electrodes and the second driving sub-electrodes.

9. The touch display panel according to claim 8, wherein the first driving sub-electrodes are electrically connected to corresponding ones of the second driving sub-electrodes, respectively.

10. A method for driving a touch display panel that comprises an array substrate and a cell alignment substrate that is arranged oppositely to the array substrate, a first touch driving electrode, a second touch driving electrode, a first touch sensitive electrode and a second touch sensitive electrode;
- wherein the first touch sensitive electrode is on the cell alignment substrate, and the second touch sensitive electrode is on the array substrate; wherein the first touch driving electrode and the second touch driving electrode are in different layers between the first touch sensitive electrode and the second touch sensitive electrode; the first touch driving electrode and the first touch sensitive electrode define a first touch structure; the second touch driving electrode and the second touch sensitive electrode define a second touch structure; and the first touch structure and the second touch structure are at two sides of the touch display panel respectively;
- wherein the method comprises:
- judging whether the touch display panel is in a single-sided touch mode or a double-sided touch mode;
- when the touch display panel is in the single-sided touch mode, judging whether the first touch structure or the second touch structure is selected for a touch operation;
- when the first touch structure is selected for the touch operation, closing the second touch structure, applying a touch driving signal to the first touch driving electrode, detecting a first touch sensitive signal generated by coupling a mutual capacitance between the first touch sensitive electrode and the first touch driving electrode, and determining touch position information according to change of the first touch sensitive signal;
- when the second touch structure is selected for the touch operation, closing the first touch structure, applying a touch driving signal to the second touch driving electrode, detecting a second touch sensitive signal generated by coupling a mutual capacitance between the second touch sensitive electrode and the second touch driving electrode, and determining touch position information according to change of the second touch sensitive signal;
- when the touch display panel is in the double-sided touch mode,
- applying a touch driving signal to the first touch driving electrode and the second touch driving electrode simultaneously;
- detecting a first touch sensitive signal generated by coupling the mutual capacitance between the first touch sensitive electrode and the first touch driving electrode, and detecting a second touch sensitive signal generated by coupling the mutual capacitance between the second touch sensitive electrode and the second touch driving electrode; and determining touch position information according to the change of the first touch sensitive signal and the change of the second touch sensitive signal.

* * * * *